United States Patent [19]
Brooke

[11] Patent Number: 5,909,591
[45] Date of Patent: Jun. 1, 1999

[54] SYSTEM AND METHOD FOR IDENTIFYING INDIVIDUAL MODULES IN A MODULAR SYSTEM

[75] Inventor: John Christopher Brooke, Dallas, Tex.

[73] Assignee: Lucent Technologies Inc., Murray Hill, N.J.

[21] Appl. No.: 08/666,718

[22] Filed: Jun. 18, 1996

[51] Int. Cl.⁶ .................................................. G06F 12/00
[52] U.S. Cl. ......................... 395/829; 395/823; 395/651
[58] Field of Search .................................. 395/823, 829, 395/851; 111/5, 172; 340/825.52

[56] References Cited

U.S. PATENT DOCUMENTS

| | | | |
|---|---|---|---|
| 4,698,517 | 10/1987 | Tohya | 307/43 |
| 4,980,806 | 12/1990 | Taylor et al. | 362/85 |
| 5,204,669 | 4/1993 | Dorfe et al. | 340/825.52 |
| 5,229,993 | 7/1993 | Foudriat et al. | 370/85.3 |
| 5,278,829 | 1/1994 | Dunlap | 370/94.1 |
| 5,345,447 | 9/1994 | Noel | 370/67 |
| 5,355,375 | 10/1994 | Christensen | 370/85.2 |
| 5,357,621 | 10/1994 | Cox | 711/172 |
| 5,386,466 | 1/1995 | Bales et al. | 379/220 |
| 5,386,515 | 1/1995 | Martin et al. | 395/275 |
| 5,416,780 | 5/1995 | Patel | 370/95.3 |
| 5,465,254 | 11/1995 | Wilson et al. | 370/79 |
| 5,524,269 | 6/1996 | Hamilton et al. | 395/829 |
| 5,592,881 | 1/1997 | Rabjohns | 101/483 |
| 5,689,675 | 11/1997 | Buji et al. | 711/5 |
| 5,689,726 | 11/1997 | Lin | 395/830 |
| 5,740,023 | 4/1998 | Brook et al. | 363/65 |

*Primary Examiner*—Christopher B. Shin

[57] ABSTRACT

In a modular system having a plurality of modules therein, an identification system for, and method of, identifying individual ones of the plurality of modules. The identification system includes: (1) a request generator, associated with a controller of the modular system, that requests each of the ones of the modules to select a polling number, the controller polling the ones of the modules as a function of a value of the polling number to obtain an identification code associated therewith and (2) a polling generator within the controller that assigns a logical identification number to the each of the ones of the modules as a function of the value of the polling number.

30 Claims, 3 Drawing Sheets

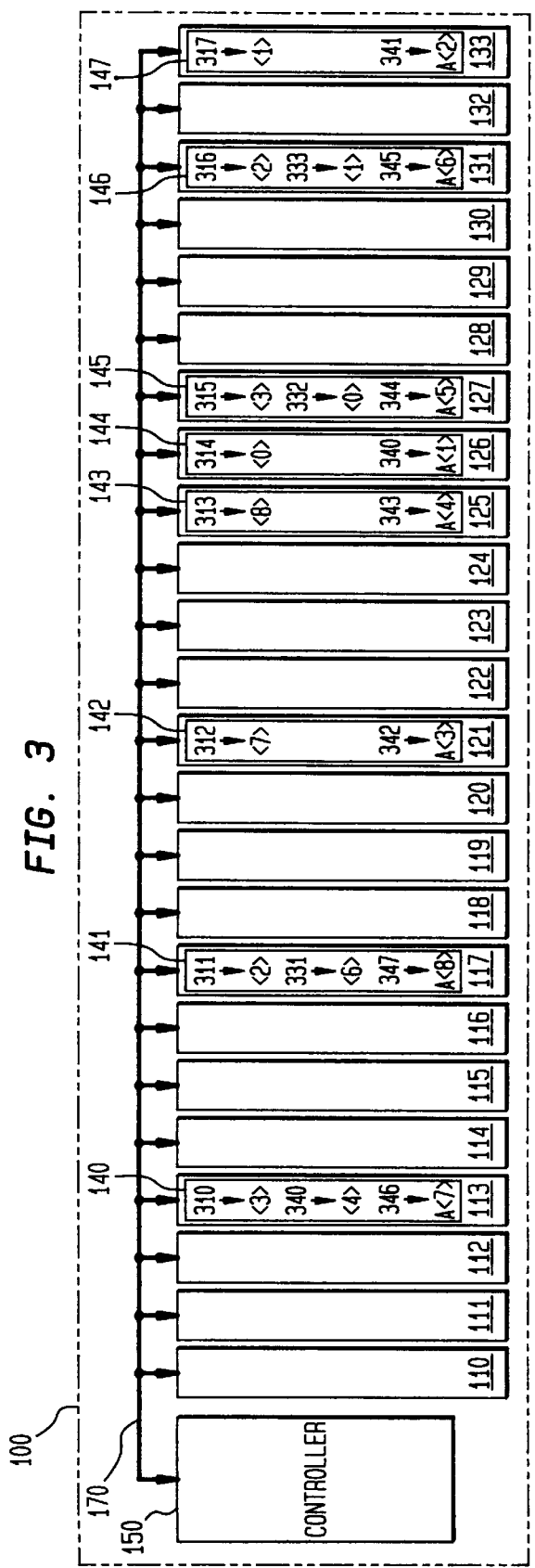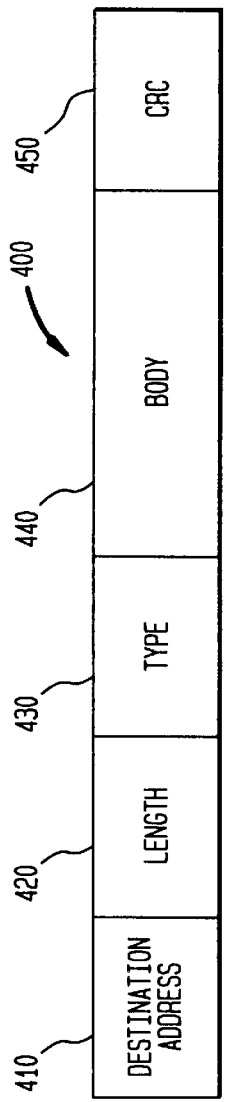

SYSTEM AND METHOD FOR IDENTIFYING INDIVIDUAL MODULES IN A MODULAR SYSTEM

TECHNICAL FIELD OF THE INVENTION

The present invention is directed, in general, to modular systems and, more specifically, to a system and method for identifying individual modules in a modular system.

BACKGROUND OF THE INVENTION

Modular systems having addressable or non-addressable slots for receiving a plurality of individual modules are employed in many technology related areas. For instance, modular power supplies, made up of a collection of separate, parallel-coupled power supply modules under unified control, are enjoying ever-widening application today, primarily due to their ability to deliver more power more reliably, because the load is shared more or less evenly among the separate power supply modules. The modular architecture is also more flexible, allowing individual modules to be easily removed and replaced to accommodate changes in power supply requirements. Finally, the modular architecture allows failed modules to be easily replaced.

Conventionally, the power supply may employ multiple parallel-coupled converters in separate modules that convert an AC input voltage to a DC output voltage. Again, the power supply may employ multiple converters in separate modules to increase the overall capacity and reliability of the power supply. The converters, in such a system, share the load to, among other things, evenly distribute stresses between the separate modules, while maintaining a regulated output to the load. Also, when a failure occurs in a modular system, it is possible to identify and shut-down the failed unit without affecting the other parallel connected units and minimizing the overall affects on the output of the power supply. In many modular power supplies, a centralized controller is employed to monitor the individual modules and initialize the power supply modules as they are incorporated into the power supply. Separate physical links between the centralized controller and each individual power supply module are employed to transmit the information therebetween.

While uniform power distribution or load sharing is a goal of parallel converters in the modular power supply, several factors contribute to non-uniform distribution. For instance, as component tolerances and the characteristics of the components change due to uneven aging and different physical conditions, the power distribution therefrom also changes. Also, the non-identical characteristics of the electrical conductors (e.g., separate physical links of varying length) connecting the individual converter modules to the load contribute to the non-uniform power distribution from the power supply modules. While the deterioration of the individual component modules due to uneven aging of the modules therein, for instance, cannot be cured by the system, there are other areas where the modular system may be improved to increase an overall reliability of the power supply.

For instance, employing a serial bus with separate connectors to each individual module removes a portion of the non-identical characteristics of the electrical conductors connected to each module. However, there still must be a system that manages the transmission of information between the centralized controller and the individual modules. There also must be a protocol that detects, assigns addresses and initializes new stations as they are incorporated into the power supply. One such initialization alternative is to employ operator-setable switches to physically and externally address a new station as it is added to the power supply. Alternatively, still other protocols, employing collision detection, may be employed to overcome address resolution problems. However, it is desirable to employ a system protocol that does not require either prior configuration or collision detection circuitry. For the same, or very different reasons, modular systems are applicable to a vast array of technology related areas and, as a result, efforts are ongoing to enhance the operation thereof.

Accordingly, what is needed in the art is a protocol for a modular system that automatically detects, assigns addresses to and initializes components in the modular system and is operable to monitor an operation of the components in the modules of the modular system.

SUMMARY OF THE INVENTION

To address the above-discussed deficiencies of the prior art, the present invention provides, in a modular system having a plurality of modules therein, an identification system for, and method of, identifying individual ones of the modules. The system includes: (1) a request generator, associated with a controller of the modular system, that requests each of the ones of the modules to select a polling number, the controller polling the ones of the modules as a function of a value of the polling number to obtain an identification code associated therewith and (2) a polling generator within the controller that assigns a logical identification number or unique address to the each of the ones of the modules as a function of the value of the polling number.

The identification system identifies individual modules in the modular system without operator intervention or prior configuration. The system is capable of, among other things, detecting new modules, assigning logical addresses to the individual modules, maintaining the modules in a connected state and in connection therewith monitoring the operation of the connected modules. In accomplishing the aforementioned functions, the identification system continuously polls to detect new modules and to reestablish contact with a disconnected module. The identification system also provides a keep alive command to maintain connectivity with the modules already connected in the modular system.

In an alternative embodiment of the present invention, the polling number is a random number. The identification system requests the modules located in the modular system; the controller polls the modules as a function of a value of the polling number to obtain an identification code associated therewith. Employing a random number as the polling number spreads out the responses from the individual modules thereby increasing the speed of the automatic address resolution and initialization process.

In an alternative embodiment of the present invention, the modular system includes a plurality of non-addressable module slots capable of receiving the modules therein. The plurality of non-addressable slots are coupled to the controller by a common bus (e.g., a serial bus). The identification system identifies individual modules actually received in ones of the plurality of non-addressable slots of the modular system without operator intervention or prior configuration. Also, by employing a common bus such as a serial bus, the simplicity of the modular system design is enhanced. One skilled in the art should understand that other system architectures are well within the broad scope of the present invention. Additionally, the identification system of the present invention is also applicable to modular systems employing addressable slots therein. Under such circumstances, the normally addressable slots of the modular system are functionally non-addressable, since the present invention makes no use of their addressability.

In an alternative embodiment of the present invention, the modular system is a power supply module and the modules are power supply modules having power conversion circuitry, the controller employing the logical identification number to address each of the ones of the power supply modules to coordinate an operation thereof in the modular power supply. In the present embodiment, the identification system is employed in a modular power supply having a plurality of power supply modules. The identification not only detects and initializes power supply modules, but it maintains the connectivity and monitors the operation of the connected power supply modules. For instance, if the controller detects a high voltage condition in the plant employing the power supply, the controller may transmit a message to the power supply modules to temporarily disable the modules until the potentially dangerous condition ceases. One skilled in the pertinent art should understand that the modular power supply is submitted for illustrative purposes only and all types of modular systems are well within the broad scope of the present invention.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which:

FIG. 3 illustrates a schematic diagram of the modular system of FIG. 1 further demonstrating the method of FIG. 2; and FIG. 4 illustrates a block diagram of one embodiment of a message packet constructed according to the principles of the present invention.

DETAILED DESCRIPTION

Figure 1:
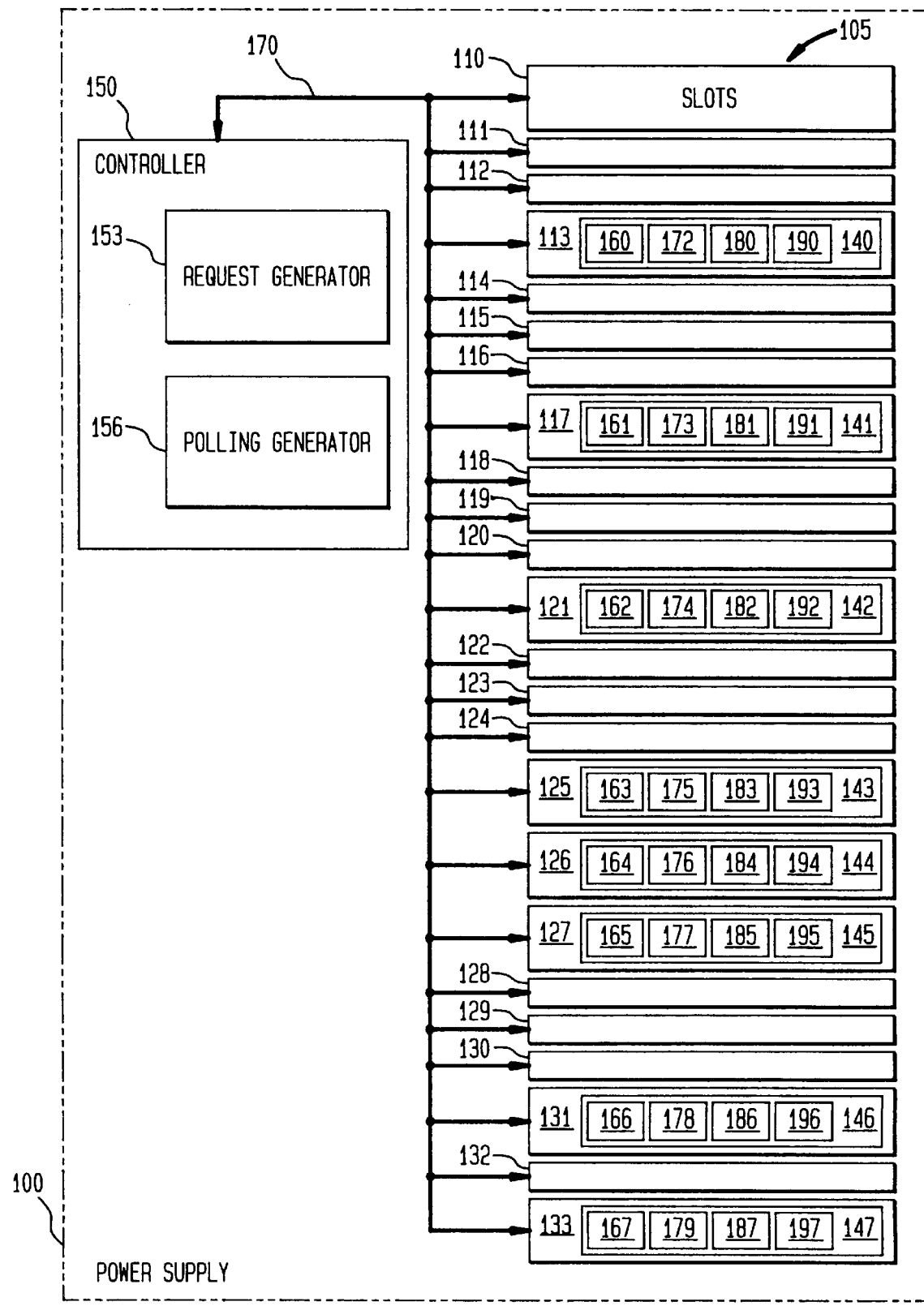
FIG. 1 illustrates a schematic diagram of one embodiment of a modular system having a plurality of non-addressable slots and including a selected number of modules employing an identification system according to the principles of the present invention.

Referring initially to FIG. 1, illustrated is a schematic diagram of one embodiment of a modular system (e.g., modular power supply 100) having a plurality of non-addressable slots 110–133 and including a selected number of modules (e.g., power supply modules 140–147) employing an identification system according to the principles of the present invention. While the identification system will hereinafter be described with respect to a modular power supply having the plurality of non-addressable slots and power supply modules therein, one skilled in the pertinent art should understand that the principles of the present invention are equally applicable to any modular system (e.g., a modular remote monitoring system). The non-addressable slots 110–133, contained in a chassis (generally designated 105), are each capable of receiving modules therein. The power supply modules 140–147 are actually inserted into the non-addressable module slots 113, 117, 121, 125, 126, 127, 131, 133, respectively. The modular power supply 100 also includes a controller (e.g., a Galaxy controller as manufactured by Lucent Technologies, Inc., of Mesquite, Tex.) 150, coupled to the non-addressable module slots 110–133 by a common bus (e.g., a serial bus) 170 (employing, for instance, a RS-485 bus interface standard), for coordinating an operation of the power supply modules 140–147 to control an output of the modular power supply 100.

The identification system of the present invention includes a request generator 153 and polling generator 156 in the illustrated embodiment. The identification system of the present invention still further includes a polling number generator 160–167, identification code transmitter 172–179 and memory 180–187 associated with each of the power supply modules 140–147, respectively. The controller 150 includes the request generator 153 for generating a request signal that requests each of the power supply modules 140–147 to select a polling number. The polling number generator 160–167 generates a random polling number for each of the power supply modules 140–174, respectively, in response to receipt of the request signal.

The controller 150 still further includes the polling generator 156, for: (1) polling the power supply modules 160–167 to determine which of the power supply modules 160–167 has generated a polling number having a particular value, (2) obtaining an identification code (via the identification code transmitter 172–179 of each power supply module 140–147, respectively) from one of the power supply modules when only one of the power supply modules has generated the polling number having the particular value, (3) assigning a logical identification number or unique address to the one of the power supply modules (to be stored in the memory 180–187 associated with each of the power supply modules 140–147, respectively); (4) selecting a new particular value and (5) repeating the steps of polling, obtaining, assigning and selecting until all of the power supply modules 160–167 have been assigned logical identification numbers.

Finally, the power supply modules 140–147 each include power conversion circuitry 190–197, respectively. The controller 150 employs the logical identification number to address the power supply modules 140–147 to coordinate an operation thereof. The power conversion circuitry 190–197 may, for instance, include a DC\DC converter with a rectifier having a MC68HC11 microcontroller as manufactured by Motorola, Inc., of Phoenix, Ariz. As previously mentioned, the controller 150 monitors an operation of the power supply modules 140–147. As an example, if the controller 150 detects a high voltage condition in the plant employing the modular power supply 100, the controller 150 may transmit a message to the power conversion circuitry 190–197 of the power supply modules 140–147, respectively, to temporarily disable the modules until the potentially dangerous condition ceases.

The functionality of the controller 150 is generally embodied in software. The software generally includes a plurality of instructions that are stored in a conventional memory or other equivalent storage medium (not shown) associated with the controller 150. The instructions are readable and executable by the power supply modules 140–147 having a processor associated therewith. The memory and storage media may be embodied in, without limitation, a magnetic, optical, or semiconductor medium. One skilled in the pertinent art should understand that the functionality of the controller 150 may also be embodied, without limitation, in hardware or firmware.

Figure 2:
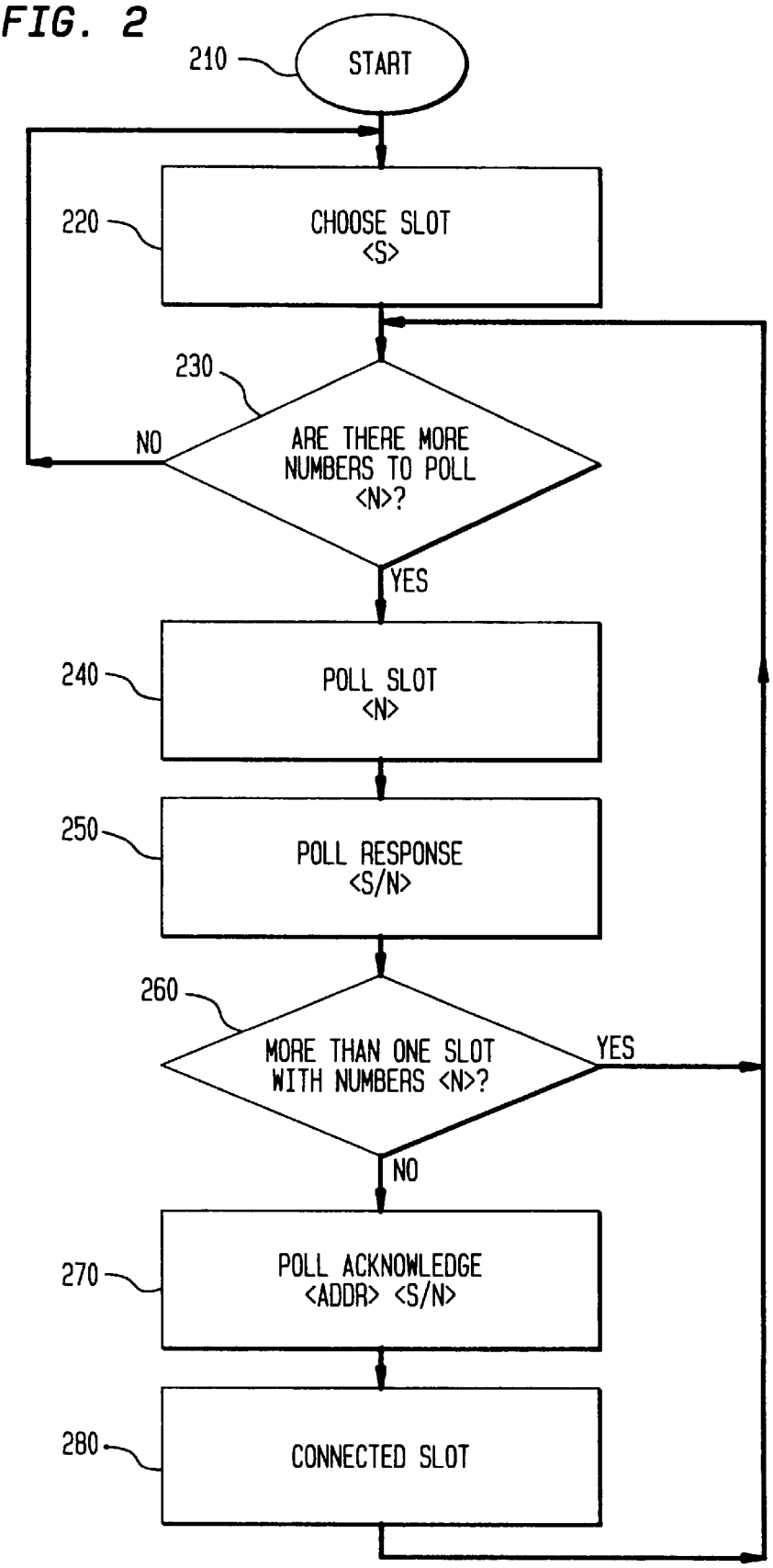
FIG. 2 illustrates a flow diagram of one embodiment of a method of identifying modules of a modular system constructed according to the principles of the present invention.

Turning now to FIG. 2, illustrated is a flow diagram of one embodiment of a method of identifying modules of a modular system constructed according to the principles of the present invention. A single request for all modules to identify themselves would result in all modules responding simultaneously thereby causing collisions along a bus coupling a controller and the modules. The objective is therefore to communicate with the modules in an orderly manner to decrease the number of collisions and expedite the initialization of the modules and the communication between the controller and modules. The method of the present invention employs a link establishment system that requests the modules to generate a random number to thereby spread out the responses from the individual modules. The method begins at a start step 210 and then proceeds with the controller of the modular system issuing a choose slot <S> command at a choose slot step 220. In response thereto, the modules in a disconnected state generate a random number integer number within a range of 0 to S where S is an integer supplied by the controller during the choose slot step 220.

Transitioning to the next series of steps, in a first decisional step 230, it is determined if there are more numbers for the controller to poll for. If there are no more numbers to poll for, the method returns to the start step 210, otherwise the method proceeds to a poll slot step 240. In the poll slot step 240, the controller issues a poll slot <N> command; in response thereto, any module with the random integer value N responds with a poll response <serial number ("s/n")> message in a poll response step 250. The poll response <s/n> message also includes a serial number of the responding power supply module to provide an identity therefor. The serial number is a physical address that may be an eleven (11) digit code that includes specific information about the module such as the month and year of manufacture, location code or manufacturing facility and a random identification code.

In a second decisional step 260, it is determined if more than one module responded with the integer value N. If more than one module responded with the integer value N, the controller receives garbage and the method returns to the first decisional step 230, otherwise the method proceeds to a poll acknowledge step 270. In the poll acknowledge step 270, the controller responds with a poll acknowledge <Address> <s/n> by assigning a logical address to the responding module. Upon receipt of the poll acknowledge message, the module enters a connected state in a connected step 280. The method then proceeds to the first decisional step 230 and the continuous method proceeds to poll for all numbers 0 to S. The method employs a random number selection by the modules between the range of 0 to S as selected by the controller. The range should be selected to expeditiously connect the disconnected modules, while keeping the overhead down to a reasonable number. Stated another way, polling the bus too infrequently will result in the slow recognition of new modules. Conversely, polling the bus more frequently will speed up the recognition of new modules, but will reduce the bandwidth of the bus for useful data transfer.

Turning now to FIG. 3, illustrated is a schematic diagram of the modular system of FIG. 1 further demonstrating the method of FIG. 2. The modular system of FIG. 1 is a modular power supply 100 having power supply modules 140–147 therein and, as previously mentioned, is submitted for illustrative purposes only. The request generator (see FIG. 1) of the controller 150 generates a request signal that requests each of the power supply modules 140–147 to select a polling number between <0> and <8>. The polling number generator (see FIG. 1) generates a polling number for each of the power supply modules 140–174 in response to receipt of the request signal. The first power supply module 140 selects random number <3> 310; the second power supply module 141 selects random number <2> 311; the third power supply module 142 selects random number <7> 312; the fourth power supply module 143 selects random number <8> 313; the fifth power supply module 144 selects random number <0> 314; the sixth power supply module 145 selects random number <3> 315; the seventh power supply module 146 selects random number <2> 316; the eighth power supply module 147 selects random number <1> 317.

The polling generator (see FIG. 1) of the controller 150 begins polling the power supply modules 140–147 for the polling numbers beginning with the integer value <0>. The identification code transmitter (see FIG. 1) of the sixth power supply module 144 responds with the serial number assigned thereto; the polling generator of the controller 150 then assigns a logical address or identification number <1> 340 to the sixth power supply module 144. The polling generator then polls for the integer value <1>. The identification code transmitter of the eighth power supply module 147 responds with the serial number assigned thereto; the polling generator of the controller 150 then assigns a logical address <2> 341 to the eighth power supply module 147.

The polling generator then polls for the integer value <2>. The identification code transmitter of the second power supply module 141 responds with the serial number assigned thereto and the identification code transmitter of the seventh power supply module 146 responds with the serial number assigned thereto; the polling generator of the controller 150 receives garbage and therefore cannot assign a logical address to either the second or seventh power supply modules 141, 146. The polling generator then polls for the integer value <3> and since two power supply modules (the first and sixth power supply modules 140, 145) selected the integer value <3> then both the first and sixth power supply modules 140, 145 are also not assigned logical addresses.

The polling generator then polls for the integer values <4>, <5> and <6> and fails to receive a response thereto because none of the power supply modules selected one of those numbers. Finally, the polling generator polls for the integer values <7> and <8> and analogous to the procedure described above the third power supply module 142 is assigned a logical address <3> 342 and the fourth power supply module 143 is assigned a logical address <4> 343. The logical addresses for each of the power supply modules 140–147 are stored in the memory (see FIG. 1) associated with each module. At this point in the process, four modules (the third, fourth, fifth and eighth power supply modules 142, 143, 144, 147) have entered the connected state and four modules (the first, second, sixth and seventh power supply modules 140, 141, 145, 146) remain disconnected.

Since the polling generator completed the polling of all eight numbers <0> through <8>, the process commences from the beginning once again. The request generator generates a request signal that requests each of the power supply modules 140–147 to select a polling number between <0> and <8>. The polling number generator of each disconnected power supply module 140, 141, 145, 146 generates a polling number in response to receipt of the request signal. The first power supply module 140 selects random number <4> 330; the second power supply module 141 selects random number <6> 331; the sixth power supply module 145 selects random number <0> 332; the seventh power supply module 146 selects random number <1> 333.

The polling generator then begins the polling process as described above and the following logical addresses are assigned to the remaining power supply modules 140, 141, 145, 146. The first power supply module 140 is assigned a logical address <7> 346; the second power supply module 141 is assigned a logical address <8> 347; the sixth power supply module 145 is assigned a logical address <5> 344; the seventh power supply module 146 is assigned a logical address <6> 345. While all of the power supply modules 140–147 are now in the connected state, the method of the present invention continues for several reasons, namely, but without limitation, to detect any new power supply modules added to the modular power supply 100, to keep alive the presently connected power supply modules 140–147 and to monitor the operation of the power conversion circuitry (see FIG. 1) associated with each power supply module 140–147.

The identification system of the present invention also accommodates for breakdowns of the detection and initialization process. For instance, if two power supply modules inadvertently are assigned the same logical address, the controller 150 would not receive a response from the poll of the offending logical address due to the collisions along the common bus 170. The controller 150 then ceases polling the offending address and the power supply modules would transfer to the disconnected state and reenter the initialization process as described above.

Turning now to FIG. 4, illustrated is a block diagram of one embodiment of a message packet 400 constructed according to the principles of the present invention. The message packet 400 includes a destination address field 410, length field 420, type field 430, body field 440 and a cyclical redundancy check ("CRC") field 450. The destination address field 410 includes the logical address of the controller or module(s) being addressed and the length field 420 presents the length of the message packet 400. One skilled in the art should understand the purpose of the CRC field 450 to monitor the integrity of the message packet 400, so the function of the CRC field 450 will not be described in greater detail. The following table (TABLE I) summarizes the representative contents of the remaining fields of the message packet 400.

TABLE I

| MESSAGE DESCRIPTION | MESSAGE TYPE VALUE | BODY | DIRECTION | ADDRESSING |
|---|---|---|---|---|
| (Message Description) | | | | |
| Choose Slot | C | Max. No. slots | Controller ("CT") to Module ("M") | Broadcast |
| Poll Slot | P | Slot No. | CT to M | Broadcast |
| Poll Response | p | s/n | M to CT | |
| Poll Acknowledge | A | Addr., s/n | CT to M | Broadcast |

TABLE I-continued

| MESSAGE DESCRIPTION | MESSAGE TYPE VALUE | BODY | DIRECTION | ADDRESSING |
|---|---|---|---|---|
| (Message Description) | | | | |
| Read | R | Parameter ("Para.") No. | CT to M | (with s/n) Single address |
| Write | W | Para. No., Para. value | CT to M | Broadcast, Group or Single address |
| Read Response | r | Para. No., Para. value | M to CT | |

The type field 430 and body field 440 include the messages as illustrated in columns two and three, respectively, of TABLE I. For an explanation of the choose slot, poll slot, poll response and poll acknowledge messages see the description with respect to FIG. 2. The read, write and read response messages are applicable to the module's normal operation parameters. The parameters include, without limitation, serial number of a module, group address of a group of modules, application software version number, date of manufacture and repair history of a module, status and command information regarding a module.

The controller sends a read message to a module requesting the value of a particular parameter and the responds with a read response message including the value of the parameter requested. The controller may also modify a particular value by sending a write message to a module or group of modules. Additionally, the addressing is arranged into three categories. Single addressing pertains to an address directed at a particular module or the controller. Group addressing pertains to an address directed at a group of modules. Broadcast addressing pertains to an address directed at all modules inserted into a modular system. The aforementioned packet structure and message types are submitted for illustrative purposes only and other embodiments are well within the broad scope of the present invention.

Although the present invention has been described in detail, those skilled in the art should understand that they can make various changes, substitutions and alterations herein without departing from the spirit and scope of the invention in its broadest form.

What is claimed is:

1. A method for detecting a plurality of modules and assigning a unique address to each one of said plurality of modules, comprising the steps of:
   generating a specified range in a controller and transmitting said specified range to said each one of said plurality of modules;
   generating a value from said specified range in said each one of said plurality of modules;
   selecting a particular value from said specified range;
   polling said plurality of modules for said particular value;
   assigning a unique address to said one of said plurality of modules where said particular value matches said value;
   selecting a new particular value; and
   repeating the steps of polling, assigning and selecting until all of said plurality of modules have been assigned a unique address.

2. The method as recited in claim 1 further comprising the step of requesting said each one of said plurality of modules to generate said value from said specified range.

3. The method as recited in claim 1 wherein if more than one of said each one of said plurality of modules generates a substantially equal value then said each one of said plurality of modules with said substantially equal value are not assigned a unique address, the method further comprising the step of repeating the steps of generating, selecting, polling, assigning and selecting until all remaining plurality of modules have been assigned a unique address.

4. The method as recited in claim 1 wherein said value is a random number.

5. The method as recited in claim 1 wherein said each one of said plurality of modules resides in an individual one of a plurality of non-addressable slots of a modular system, said specified range being a value less than a number of said plurality of non-addressable slots.

6. The method as recited in claim 1 wherein the steps of selecting, polling, assigning and selecting are performed by a controller in a modular system, said plurality of modules being coupled to said controller by a common bus.

7. The method as recited in claim 1 wherein said plurality of modules are power supply modules encompassed in a modular power supply having a controller and each one of said power supply modules has power conversion circuitry associated therewith, said controller employing said unique address to address said each one of said plurality of modules to coordinate an operation thereof in said modular power supply.

8. In a modular system having a plurality of modules therein, an identification system for identifying individual ones of said modules, comprising:

a request generator, associated with a controller of said modular system, that assigns a specified range and requests each of said ones of said modules to select a polling number from said specified range, said controller polling said ones of said modules as a function of a value of said polling number to obtain an identification code associated therewith; and a polling generator within said controller that assigns a logical identification number to said each of said ones of said modules as a function of said value of said polling number.

9. The identification system as recited in claim 8 wherein said polling number is a random number.

10. The identification system as recited in claim 8 wherein said modular system comprises a plurality of non-addressable module slots for receiving said modules therein, said plurality of non-addressable slots being coupled to said controller by a common bus.

11. The identification system as recited in claim 8 wherein said modular system is a modular power supply and said modules are power supply modules having power conversion circuitry, said controller employing said logical identification number to address individual ones of said power supply modules to coordinate an operation thereof in said modular power supply.

12. An identification system for identifying individual modules received into a plurality of non-addressable module slots in a modular system, comprising:

a request generator, associated with a controller of said modular system, for assigning a specified range and generating a request signal requesting each of said modules to select a polling number from said specified range;

a polling number generator, associated with said each of said modules, for generating a polling number in response to receipt of said request signal; and a polling generator, associated with said controller, for:
  polling said modules to determine which of said modules has generated a polling number having a particular value,
  obtaining an identification code from one of said modules when only said one of said modules has generated said polling number having said particular value,
  assigning a logical identification number to said one of said modules,
  selecting a new particular value, and
  repeating said steps of polling, obtaining, assigning and selecting until all of said modules have been assigned logical identification numbers.

13. The identification system as recited in claim 12 wherein said polling number is a random number.

14. The identification system as recited in claim 12 wherein a common bus couples said controller to said plurality of non-addressable module slots.

15. The identification system as recited in claim 12 wherein said modular system is a modular power supply and said modules are power supply modules having power conversion circuitry, said controller employing said logical identification number to address individual ones of said power supply modules to coordinate an operation thereof in said modular power supply.

16. For use in a non-addressable module slot of a modular system, a module, comprising:

a polling number generator that generates a polling number from a specified range provided by a controller of said modular system in response to receipt of a request signal from said controller;

an identification code transmitter that transmits an identification code to said controller in response to a polling signal from said controller; and a memory that stores a logical identification number assigned by said controller to said module, said module thereby logically identifiable within said modular system.

17. The module as recited in claim 16 wherein said polling number is a random number.

18. The module as recited in claim 16 wherein a common bus couples said controller to said non-addressable module slot.

19. The module as recited in claim 16 wherein said modular system is a power supply module and said module is a power supply module having power conversion circuitry, said controller employing said logical identification number to address multiple power supply modules received into non-addressable module slots of said modular power supply to coordinate an operation of said multiple power supply modules.

20. In a modular system having a plurality of modules therein, a method of identifying individual ones of said modules, comprising the steps of:

generating a specified range in a controller and transmitting said specified range to said each one of said plurality of modules;

requesting each of said ones of said modules to select a polling number from said specified range;

polling said ones of said modules as a function of a value of said polling number to obtain an identification code associated therewith; and assigning a logical identification number to said each of said ones of said modules as a function of said value of said polling number.

21. The method as recited in claim 20 wherein said polling number is a random number.

22. The method as recited in claim 20 wherein said modular system comprises a plurality of non-addressable module slots for receiving said modules therein.

23. The method as recited in claim 20 wherein said modular system is a modular power supply and said modules are power supply modules with power conversion circuitry, the method further comprising the step of employing said logical identification number to address individual ones of said power supply modules to coordinate an operation thereof in said modular power supply.

24. A method of identifying individual modules received into a plurality of non-addressable module slots in a modular system, comprising the steps of:

generating a specified range in a controller and transmitting said specified range to said each one of said plurality of modules;

generating a request signal requesting each of said modules to select a polling number from said specified range;

generating a polling number in said each of said modules in response to receipt of said request signal;

polling said modules to determine which of said modules has generated a polling number having a particular value;

obtaining an identification code from one of said modules when only said one of said modules has generated said polling number having said particular value;

assigning a logical identification number to said one of said modules;

selecting a new particular value; and repeating said steps of polling, obtaining, assigning and selecting until all of said modules have been assigned logical identification numbers.

25. The method as recited in claim 24 wherein said polling number is a random number.

26. The method as recited in claim 24 wherein said modular system comprises a controller coupled to said plurality of non-addressable module slots by a common bus.

27. The method as recited in claim 24 wherein said modular system is a modular power supply and said modules are power supply modules having power conversion circuitry, the method further comprising the step of employing said logical identification number to address individual ones of said power supply modules to coordinate an operation thereof in said modular power supply.

28. A modular power supply, comprising:

a chassis having a plurality of non-addressable module slots capable of receiving power supply modules therein;

a variable number of power supply modules actually received into said non-addressable module slots;

a controller, coupled to said non-addressable module slots by a common bus, capable of coordinating an operation of said variable number of power supply modules to control an output of said modular power supply;

a request generator, associated with said controller, for assigning a specified range and generating a request signal requesting each of said variable number of power supply modules to select a polling number from said specified range;

a polling number generator, associated with said each of said variable number of power supply modules, for generating a polling number in response to receipt of said request signal; and a polling generator, associated with said controller, for:
   polling said power supply modules to determine which of said power supply modules has generated a polling number having a particular value,
   obtaining an identification code from one of said power supply modules when only said one of said power supply modules has generated said polling number having said particular value,
   assigning a logical identification number to said one of said power supply modules,
   selecting a new particular value, and
   repeating said steps of polling, obtaining, assigning and selecting until all of said power supply modules have been assigned logical identification numbers.

29. The modular power supply as recited in claim 28 wherein said polling number is a random number.

30. The modular power supply as recited in claim 28 wherein said particular value is a value less than a number of said non-addressable slots.

* * * * *